Aug. 8, 1944.     D. MURPHY     2,355,390
BEARING
Filed March 2, 1943     2 Sheets-Sheet 1
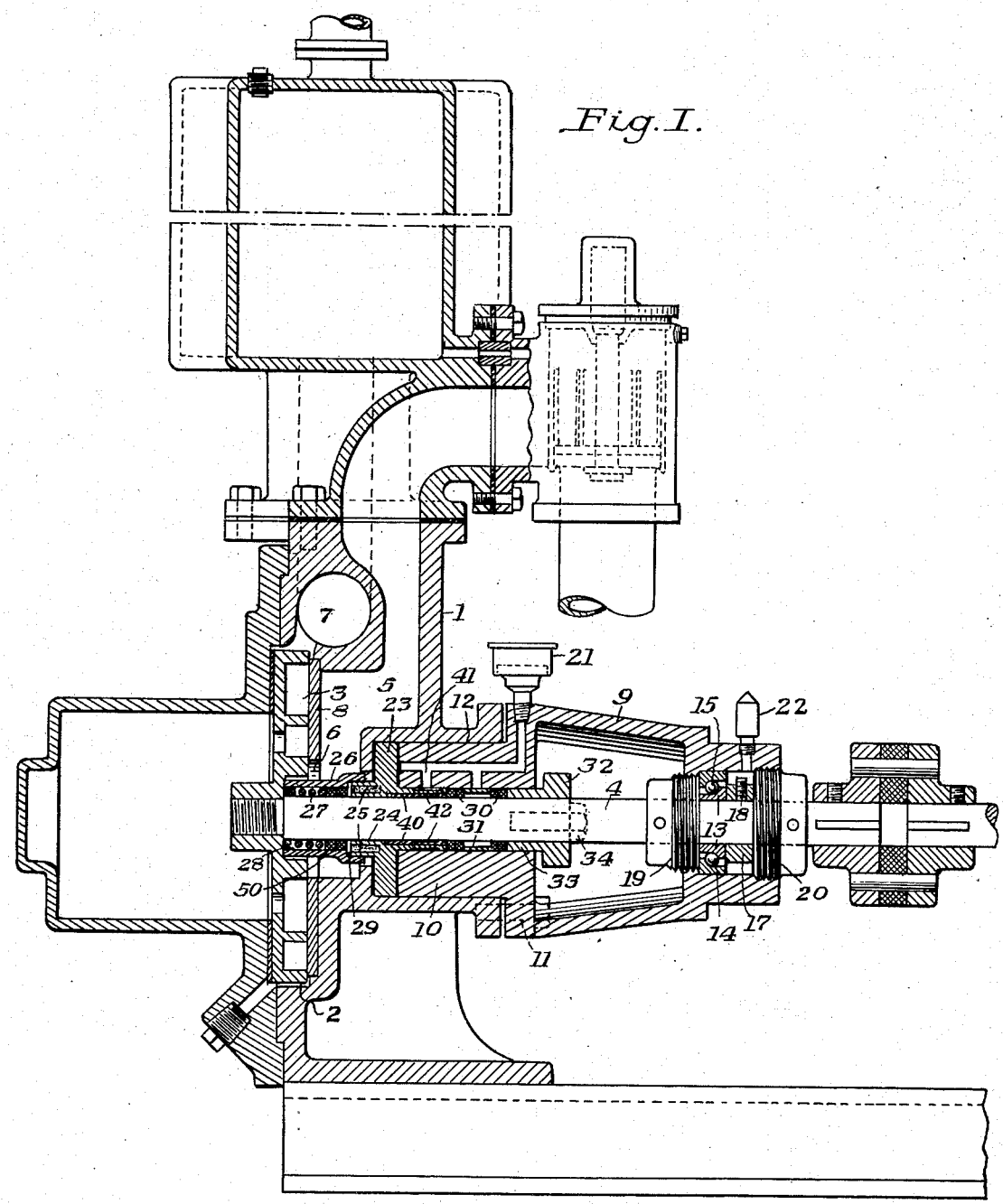
Fig.I.
INVENTOR
Daniel Murphy
by Christy, Parmelee and Strickland
his attorneys Aug. 8, 1944.   D. MURPHY   2,355,390
BEARING
Filed March 2, 1943   2 Sheets-Sheet 2
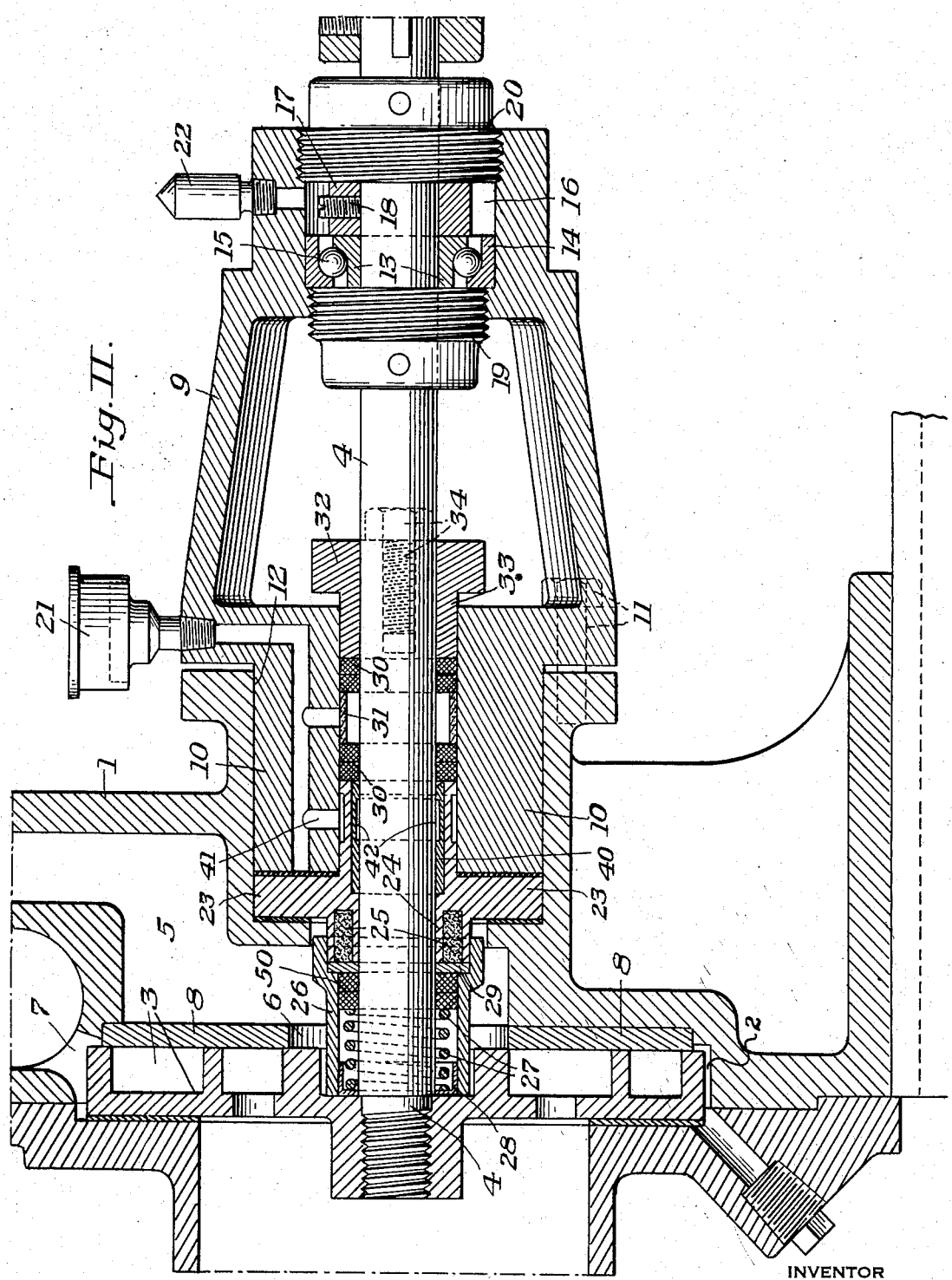
INVENTOR
Daniel Murphy
by Christy Parmelee and Strickland
his attorneys Patented Aug. 8, 1944

2,355,390

UNITED STATES PATENT OFFICE 2,355,390

BEARING

Daniel Murphy, New Castle, Pa.

Application March 2, 1943, Serial No. 477,703

8 Claims. (Cl. 308—36.2)

This invention relates to bearings, and consists in simplification in structure of the bearing that is shown and described in Letters Patent of the United States No. 2,128,496, granted me August 30, 1938. In consequence of the simplification here alluded to, the bearing, without any loss in efficiency or durability, may be more cheaply constructed (and without using rubber, which, under war conditions, is not freely to be had) and more easily and expeditiously maintained in service condition.

The bearing of the invention, though adapted to wide and general use, is particularly serviceable in the mounting of the shafts of rotary pumps, and more especially of pumps for liquid that carries abrasive particles, such as the slip of the pottery industry. In the structure of the invention substantially all wear occurs between parts that may readily and economically be assembled and replaced; and adjustment for wear during intervals between replacements may readily be made. And the structure is secure against leakage.

In the accompanying drawings Fig. I is a view, partly in side elevation and partly in vertical section, of a rotary pump in which, by way of example, the bearing of the invention is employed; Fig. II is a view to larger scale, showing in vertical and axial section the bearing structure.

The pump shown in the drawings consists of a body 1, within which is formed the usual involute chamber 2, and within the chamber a vaned impeller 3, borne upon a rotary shaft 4, is arranged. Under the influence of the rotating impeller liquid is drawn from an intake passage 5 through the eye 6 of the pump, and is delivered at the periphery of chamber 2 to a discharge passage 7. When the pump is in operation, the pressure upon the delivery side, exerted upon the rotating impeller, holds the impeller under pressure in abutment upon the side wall on the right (as seen in Fig. I) of the pump chamber 2. This side wall is advantageously formed as a removable and replaceable plate 8.

The body 1 of the pump carries rigidly mounted upon it a housing 9; and within the housing two bearings are formed, which carry rotatably the shaft 4 of the impeller. The shaft 4 at its outer end (to the right, Fig. I) is adapted to be coupled to or otherwise brought into power-transmitting connection with a suitable motor; and the mounting of the shaft in two such spaced-apart bearings is a provision such as to prevent whipping of the shaft when the pump is in operation.

One of the bearings includes an annular block 10, made in one piece with the housing 9; and the block 10, and with it the integral housing, is secured by set-screws 11 in a cylindrical seat 12, formed exteriorly upon the body 1 of the pump. The other bearing consists of concentric rings 13 and 14 with rolling members, here shown to be balls 15, arranged in the race formed for them by and between the rings. The inner ring 13 fits snugly upon the shaft 4; the outer fits snugly within, but is adapted to slide longitudinally within, a bore 16, formed in the housing 9. The bearing 13, 14, 15 abuts laterally upon a ring 17, that, by set-screws 18, is secured to the shaft 4. The assembly of bearing and ring is held between two nuts 19 and 20, that, encircling the shaft 4 and movable freely along shaft 4, make screw-thread engagement with the bore 16. The housing 9 is made in the form of a cage, as shown, to afford access to the inner nut 19, for adjusting it. Means are provided for lubricating the two bearings, and conventional means are here shown, consisting of oil-cups 21 and 22, with ducts leading to the bearing surfaces.

In the second bearing (the bearing to the right), and particularly in the ring 17 and the co-operating nuts 19 and 20, means are found for adjusting the shaft 4 longitudinally, in compensation for wear of the impeller 3 upon the plate 8.

In such organization it is requisite that provision be made against withdrawal of lubricant from the bearings by the suction of the operating pump, and against ingress to the bearings, when the pump is at rest, of the liquid that is pumped, a supply of which remains standing in passage-way 5. And in the patent named above provision to such ends will be found. The present invention is found in simplification of structure, for adjustment and replacement of parts, with preventive provision of the nature and to the ends indicated.

The means for adjustment in compensation for wear found in the nuts 19 and 20 is a manifest simplification; and the removability, for purposes of replacement and repair, of the entire housing, merely by unscrewing of the nuts 19 and 20, and the drawing of the screws 11 is also manifest simplification. It remains to describe the provisions for preventing leakage.

In the seating of the bearing block 10 in the body 1 of the pump an annular shaft-encircling plate 23 is, by the screws 11, clamped to place in the bottom of the cylindrical seat. This annular plate is provided with a sleeve-like extension 24. The extension is integral with the plate itself. In the assembly it extends through the orifice in the pump wall formed for the passage of shaft 4, and into the passage 5, and adjacent the eye 6 of the pump. This extension is adapted for diminution of friction in the rotation of an adjacent body rotating in abutment upon it; and to such purpose it is provided at its extremity (to the left) with bores filled with suitable lubricant 25, such as a graphite mixture or Babbitt metal. The plate 23 with its sleeve-like extension 24, when clamped to place, constitutes within block 10 the bearing member proper. The extension 24 carries interiorly a bronze bushing 40, within which the shaft turns. Lubrication ducts are indicated at 41, 42. The annular plate is clamped with sealing effect to the wall of the pump casing, and its integral sleeve-like extension is the immediate bearing member for the shaft; and, accordingly, I term the member 23, with its extension 24, the inner bearing and sealing member.

A housing 26 surrounding the shaft 4 is arranged within the pump passage 5. This housing at one end (to the left) is engaged by the body of the impeller; at the opposite end (to the right) it is belled and overlies the extension 24 upon plate 23. The housing is of an internal diameter sufficiently greater than the diameter of the shaft 4, to allow of the interposition of and the play of a spring 27 and packing 50. This spring, engaged at one end (to the left) by a retaining ring 28, which abuts upon the body of the impeller, exerts through packing 50 its left-to-right thrust upon a ring 29, that abuts upon the relatively frictionless end face of the extension 24. The clamping of the plate 23 to its place by the bearing block 10 will, it will be understood, exert compression upon spring 27, with the effect that ring 29 is held under pressure against the end face of extension 24. The housing 26, the spring 27, and the rings 28 and 29 rotate in unison with the shaft 4, and the ring 29 snugly encircles the shaft.

In the assembly the plate 23 with its sleeve-like extension 24 also snugly encircles the shaft. The fit is, however, not so snug as to exert any restraint upon the free turning of the shaft within the sleeve. The central bore through the bearing block 10 is of sufficiently larger diameter to form a packing gland for the shaft in its bearing block 10. In the cylindrical space formed by and between the shaft and the block 10, and closed to the left by the plate 23 with its extension 24, are arranged bodies 30 of packing that may in familiar manner be assembled in alternation with a lantern ring 31. The packing will be of the usual sort known as composition packing, as distinguished from rubber packing, and will typically consist of a strip or ring of asbestos filled with graphite. The gland is at its outer end closed by an annular block 32 with a sleeve-like extension 33, that may be adjustably anchored in the bearing block 10 by set-screws 34.

The rotating shaft, as above noted, carries with it the housing 26 and its contained spring 27, the packing 50, and the rings 28 and 29. The plate 23, clamped in place, the annulus 32, and the intervening packing 30 with the lantern ring 31 do not rotate. The suction of the rotating pump is ineffective to draw lubricant from beneath sleeve 24, nor can liquid seep from the passage 5 to the housing 9, because of the interposition of the packing 50, as well as the face-to-face clamping of the plate 23 upon the bottom of the cylindrical seat 12, and because of the bearing under pressure of the sealing ring 29 upon the sleeve 24, together with the packing in the gland of the bearing.

It will be perceived that I have sealed the passage of the pump shaft through the wall of the pump, against leakage, and by means of simple organization in which rubber is not employed; and that I have provided bearing for the pump shaft that is easily assembled and separated; that, as in course of operation the wearing plate 8 and the impeller 3 are worn away, they may readily be removed and replaced; and that, as operation continues, the adjustment nuts 19 and 20 constitute means for compensating for gradual wearing away.

In review—

In impeller pumps it is desirable to provide bearing for the impeller shaft at two spaced-apart points, so that the shaft, when in rotation, will not whip. In the early days of impeller pumps the practice was to provide bearings on the two sides of the impeller chamber. Packings were provided for both bearings. On the suction side of the impeller, when the pump was in operation, there was no tendency for liquid to leak from the pump; but on the discharge side the pressure tended to force the liquid through the packing and to the bearing. Such leakage was particularly objectionable when the liquid that was being pumped carried abrasive particles (as in the case of slip used in the manufacture of pottery). This situation led designers to arrange both of the bearings on the suction side of the pump, and this in turn led to problems in the designing of adequate packing for the bearing adjacent the suction chamber of the pump. The packing must serve a two-fold function: It must prevent lubricant from being sucked away from the bearing when the pump is in operation; and it must prevent liquid from seeping into the bearing when the pump is at rest.

There have been many structures designed to meet the need, and that of the present invention is simple, inexpensive, and easy of maintenance. Of it, it will be noted that the spring-backed sealing ring 29 is subject to no wear against the shaft, since it rotates in unison with the shaft, and abuts under spring pressure upon the lubricated end of the sleeve-like extension 24 of plate 23.

The invention manifestly is applicable, not to the shafts of rotary pumps only, but to rotary shafts generally, wherever the passage of a shaft through a wall is to be protected against the passage of liquid in response to inequality of pressure, or even under seepage.

I claim as my invention:

1. In a bearing for a rotary shaft that penetrates a wall and that includes an open-ended cylindrical seat formed integrally with the wall upon one side thereof, a sealing plate encircling the shaft, and a bearing block clamped to place in the seat with the said plate interposed between the seat and the block, the invention herein described, of the provision upon one side of the said sealing plate of a lubricated abutment surface, a spring-backed sealing ring mounted upon the shaft, and adapted to rotate with the shaft and in abutment upon the lubricated surface of the said plate, and a packing gland formed upon the opposite side of the said sealing plate by the bearing block in its encirclement of the shaft, closed at one end by the said sealing plate and at the opposite end by a block borne by the bearing block and adjustable thereon in the direction of the longitudinal extent of the shaft.

2. The structure of claim 1, the lubricated abutment surface of the sealing plate being afforded by bores sunk in the substance of the plate and filled with lubricating material.

3. The structure of claim 1, together with a housing integrally borne by the said bearing block, a second bearing block mounted in said housing and adjustable in the mounting in the direction of the longitudinal extent of the shaft, a bearing ring rigidly borne by the shaft, anti-friction members arranged between said second bearing block and said bearing ring, and two adjustment blocks in screw-threaded engagement with said housing and adjustable in the direction of the longitudinal extent of the shaft and adapted simultaneously to engage on opposite sides the bearing ring, whereby the shaft may be adjusted in its position of extension through such wall.

4. In a bearing for a rotating shaft that penetrates a wall and that includes an open-ended cylindrical seat carried integrally by the wall, a sealing plate encircling the shaft, and a bearing block including a packing gland clamped to place in the seat with the said plate interposed between the seat and the block, the invention herein described which comprises a sleeve-like extension on the sealing plate, said extension on the outer side closing the packing gland formed by the bearing block in its encirclement of the shaft and on the inner side having a lubricated face, and a sealing ring borne by and rotating in unison with the shaft and in the assembly bearing yieldingly upon the lubricated face of the said sleeve-like extension.

5. In a bearing for a rotating shaft that penetrates a wall and that includes an open-ended cylindrical seat carried integrally by the wall, a sealing plate encircling the shaft, and a bearing block including a packing gland clamped to place in the seat with the said plate interposed between the seat and the block, the invention herein described which comprises a sleeve-like extension on the sealing plate, said extension on the outer side closing the packing gland formed by the bearing block in its encirclement of the shaft and on the inner side having a lubricated face, and a sealing ring borne by and rotating in unison with the shaft and in the assembly bearing yieldingly upon the lubricated face of the said sleeve-like extension, together with a housing that encircles the shaft and the sleeve-like extension upon the sealing plate.

6. The structure of the next-preceding claim, said rotating shaft comprising the shaft of the impeller of a rotary pump, and said housing engaging the impeller body at one end and encircling said sleeve-like extension at opposite end and arranged to rotate in unison with the impeller shaft.

7. In a bearing for a rotor-equipped shaft and in combination with a ported casing and a rotor whose shaft extends through the ported casing, the invention herein described comprising an annular shaft-encircling plate that carries a sleeve-like extension and constitutes a sealing and bearing member, said sleeve-like extension having a lubricated shaft-encompassing edge, means for clamping the plate exteriorly upon the casing, and a sealing ring encircling the shaft and yieldingly held in the assembly to abutment upon said lubricated edge of the extension of the said annular plate.

8. In a bearing for a rotor-equipped shaft and in combination with a ported casing and a rotor whose shaft extends through the ported casing, the invention herein described comprising an annular shaft-encircling plate that carries a sleeve-like extension and constitutes a sealing and bearing member, said sleeve-like extension having a lubricated shaft-encompassing edge, means for clamping the plate exteriorly upon the casing, and a sealing ring and a body of packing encircling the shaft and yieldingly held in the assembly to abutment upon said lubricated edge of the extension of the said annular plate.

DANIEL MURPHY.